United States Patent [19]

Lumby et al.

[11] 4,127,416
[45] Nov. 28, 1978

[54] METHOD OF PRODUCING A CERAMIC PRODUCT

[75] Inventors: Roland J. Lumby; Bernard North, both of Birmingham; Alfred J. Taylor, West Midlands, all of England

[73] Assignee: Lucas Industries Limited, Birmingham, England

[21] Appl. No.: 815,454

[22] Filed: Jul. 13, 1977

[30] Foreign Application Priority Data

Jul. 24, 1976 [GB] United Kingdom .............. 30985/76
Jul. 24, 1976 [GB] United Kingdom .............. 30986/76
Feb. 21, 1977 [GB] United Kingdom ................ 7187/77

[51] Int. Cl.² .................... C04B 35/50; C04B 35/58
[52] U.S. Cl. ................... 106/73.2; 106/73.4; 106/73.5; 106/65
[58] Field of Search ............ 106/73.5, 73.4, 73.2, 106/65, 39.6

[56] References Cited

U.S. PATENT DOCUMENTS

| 3,883,389 | 9/1974 | Komeya et al. | 106/65 |
| 3,969,125 | 7/1976 | Komeya et al. | 106/73.5 |
| 3,989,782 | 11/1976 | Lumby et al. | 106/73.5 |
| 3,991,148 | 11/1976 | Lumby et al. | 106/73.5 |
| 3,991,166 | 11/1976 | Jack et al. | 106/73.5 |
| 4,070,198 | 1/1978 | Chyung et al. | 106/52 |
| 4,071,371 | 1/1978 | Milberg et al. | 106/73.2 |

Primary Examiner—Helen McCarthy
Attorney, Agent, or Firm—Holman & Stern

[57] ABSTRACT

A method of producing a ceramic product which comprises the step of forming a powder mixture consisting essentially of a first component consisting of compounds containing the elements silicon, aluminum, oxygen and nitrogen in proportion such that the ratio of the total number of silicon and aluminum atoms to the total number of oxygen and nitrogen atoms lies in the range 0.735 to 0.77 and such that said compounds react together during the subsequent sintering process to produce a single phase ceramic material obeying the general formula:

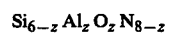

$$Si_{6-z}Al_zO_zN_{8-z}$$

where z is between 0.38 and 1.5, and between 0.1 and 10% by weight of a second component in the form of an oxide of at least one of the further elements yttrium, scandium, cerium, lanthanum and the metals of the lanthanide series. The mixture is then sintered in a protective environment at a temperature between 1600° C and 2000° C and for a time, decreasing with increasing temperature, of at least 10 minutes to at least 5 hours so as to produce a ceramic material containing at least 80% by volume of said single phase ceramic material together with a second phase containing said at least one further element.

12 Claims, No Drawings

METHOD OF PRODUCING A CERAMIC PRODUCT

This invention relates to a method of producing a ceramic product.

According to the invention, a method of producing a ceramic product comprises the steps of forming a powder mixture consisting essentially of a first component consisting of compounds containing the elements silicon, aluminum, oxygen and nitrogen in proportions such that the ratio of the total number of silicon and aluminum atoms to the total number of oxygen and nitrogen atoms lies in the range 0.735 to 0.77 and such that said compounds react together during the subsequent sintering process to produce a single phase ceramic material obeying the general formula:

$$Si_{6-z} Al_z O_z N_{8-z}$$

where $z$ is between 0.38 and 1.5, and between 0.1 and 10% by weight of a second component in the form of an oxide of at least one of the further elements yttrium, scandium, cerium, lanthanum, and the metals of the lanthanide series; and sintering said mixture in a protective environment with or without the application of pressure at a temperature between 1600° C. and 2000° C. and for a time, decreasing with increasing temperature, of at least 10 minutes to at least 5 hours so as to produce a ceramic material containing at least 80% by volume of said single phase ceramic material together with a second phase containing said at least one further element.

In the method described in the preceding paragraph, the compounds of the first component are arranged so that the sum of all the silicon and aluminum atoms in the compounds divided by the sum of all the oxygen and nitrogen atoms present is between 0.735 and 0.77, or more preferably 0.745 to 0.76. The two component mixture is then sintered in a protective environment, preferably a non-oxidizing environment or more preferably a reducing environment, at 1600° C. to 2000° C. for a time sufficient to produce at least 80% by volume of the silicon aluminum oxynitride ceramic material defined by the above formula. The sintering time required increases with decreasing temperature so that although the minimum time is only 10 minutes in the case of a 2000° C. sintering temperature, with a temperature of 1600° C. a sintering time of at least 5 hours is required. The resultant ceramic material has a crystal structure based on the hexagonal $\beta$-phase silicon nitride lattice in which the lattice has expanded to accommodate the aluminum and oxygen substituents.

The components forming the first component of the original mixture are conveniently silicon nitride, aluminum nitride, alumina and silica, with at least part of the silica and alumina being present as inherent impurities on the silicon nitride and aluminum nitride respectively.

Alternatively, the first component may be defined by silicon nitride and a ceramic intermediary containing a silicon aluminum oxynitride which does not obey the general formula $Si_{6-z} Al_z O_z N_{8-z}$. Preferably, the silicon aluminum oxynitride of the ceramic intermediary has a rhombohedral structure and obeys the approximate formula $SiAl_4O_2N_4$. Moreover, the ceramic intermediary is preferably formed by heating a powder mixture of alumina, aluminum and silicon to between 1200° C. and 1400° C. in a nitriding atmosphere, the heating rate being controlled to substantially prevent exotherming, and then sintering the nitrided mixture at a temperature between 1500° C. and 1800° C. Alternatively, the intermediary may be formed by heating a powder mixture of alumina, aluminum nitride and silicon nitride at a temperature between 1200° C. and 2000° C. in a protective environment, preferably a non-oxidizing environment or more preferably a reducing environment.

In the methods described above, the relative proportions of the compounds present in the first component of the mixture are arranged so as to produce the ceramic material $Si_{6-z} Al_z O_z N_{8-z}$ where $z$ is between 0.38 and 1.5 since having the $z$ value within these limits is found to produce a coherent product having a high strength even when the sintering is performed in the absence of pressure. If, on the other hand, the $z$ value is allowed to fall below 0.38 the material becomes difficult to sinter without the application of pressure, while the strength of the product deteriorates if the $z$ value is allowed to increase above 1.5.

Moreover, the relative proportions of the compounds in the first component are arranged so as to provide the above defined atomic ratio of between 0.735 and 0.77, since if the ratio falls below 0.735, it is found that the mixture becomes too oxygen-rich. This results in the production of an excessive amount of glass during sintering which not only has a deleterious effect on the high temperature strength properties of the product, but is also found to adversely affect the low temperature strength properties. Moreover, it is found that the glass cannot be removed by the subsequent heat treatment process discussed in detail below. By way of contrast, if said atomic ratio exceeds 0.77 it is found that there is insufficient oxygen present to form the glass required to effect consolidation of the product.

Within the permitted atomic ratio range of 0.735 to 0.77, it is found that the most advantageous results are obtained when the ratio lies between 0.745 and 0.76, with the actual value chosen depending on the intended use of the product. Thus when said atomic ratio is between 0.745 and 0.75, the final product has a relatively high glass content which leads to good low temperature properties, but a significant decrease in strength at high temperatures. On the other hand, the use of atomic ratios between 0.75 and 0.76 results in a relatively low glass content in the final product so that, although the low temperature strength may be somewhat lower than the high glass materials, there will be little or no decrease in strength up to temperatures as high as 1370° C., and in fact in some cases it is found that the strength increases with temperature.

The permitted range of 0.1 to 10% by weight for the second component of the starting mixture is also chosen on the basis that it provides a satisfactory glass content in the sintered product. The elements selected for the second component are cerium, yttrium, scandium, lanthanum or one of the lanthanide series since these have highly refractory oxides which produce high melting point glasses with the silica and alumina present and hence allow the product to be used at higher temperature than would be possible with low melting point glasses. Of the elements selected for the second component, yttrium is preferred since the presence of yttria in the sintering mixture is found to result in products of high strength even without the application of pressure.

It will be seen that performing the methods described above results in the formation of a sintered ceramic product containing at least 80% by volume of a silicon aluminum oxynitride obeying the above formula together with a glass phase containing yttrium, scandium, cerium, lanthanum or an element of the lanthanide series. As previously stated, the presence of a glass phase aids consolidation of the product during sintering but tends to result in a lowering of the high temperature properties of the final component. It has, however, been found that the amount of the glass phase in the sintered product can be reduced by subjecting the product to a final heat treatment process which involves raising the temperature of the product to within 200° C. of the melting point of the glass (i.e., to about 1400° C. in the case of an yttrium glass), and then cooling the product to crystallize at least part of the glass into a ceramic phase, normally containing a metal aluminum garnet. In this way, it is possible to use the advantageous properties of the glass in aiding the sintering operation, while at the same time reducing or removing the deleterious effects of the glass on the properties of the final product. The same effect can also be achieved by controlling cooling of the product obtained by the sintering operation so that the required crystallization is effected directly. When the further element is yttrium this is conveniently achieved by cooling from the sintering temperature at a rate between 70° C. and 90° C. per hour to a hold temperature of the order of 1300° C. to 1500° C. and holding for between 4 hours and 6 hours, followed by natural cooling to room temperature.

The invention will now be more particularly described with reference to the accompanying examples. In these examples, where reference is made to the mean modulus of rupture value of a sintered ceramic product, it is to be understood that the recited value has been obtained by subjecting a number of polished samples 0.3 cm. square in cross-section to a 3-point bend test. This comprises loading each sample, while supported by two knife-edged supports spaced ⅞ inch apart, at the midpoint between the supports. The load (W) required to cause each sample to fracture is related to the modulus of rupture (MR) by the formula:

$$MR = 3 W l g/2bd^2$$

where
$l$ = span between supports,
$g$ = acceleration due to gravity,
$b$ = breadth of sample at right angles to load,
$d$ = depth of sample in direction of load.

The mean value is calculated from the number of samples tested. The Weibull modulus is the mean value multiplied by 1.2 and divided by the standard deviation.

In a first example of the invention, a sintered ceramic material was produced from a starting mixture having a first component consisting of 92 parts by weight of silicon nitride powder having a mean particle size of 2 microns and containing 89% by weight of the α-phase material together with 4% by weight of silica as an inherent impurity, 5 parts by weight of aluminum nitride powder as supplied by Koch-Light as Type 8006H with an average particle size of 6 microns and containing 6% by weight of alumina as an inherent impurity, and 3 parts by weight of alumina powder as supplied by Line as Type B with a mean particle size of 0.05 microns. Thus, allowing for the impurities, the actual composition of the first component of the mixture was 88.32 parts by weight silica nitride, 4.7 parts by weight aluminum nitride, 3.3 parts by weight alumina, and 3.68 parts by weight silica. Thence, for each 100 g of the first component, there was 53.068 g of silica donated by the silicon nitride and a further 1.721 g donated by the silica so that the total silicon content was 54.789 g or 1.950 g atoms. Repeating this procedure for the other elements present, it can readily be shown that the first component also contained 0.179 g atom of aluminum, 2,633 g atom of nitrogen and 0.220 g atom of oxygen. This ratio of the total number of atoms of silicon and aluminum to the total number of atoms of nitrogen and oxygen was 2.129:2.853 or 0.746.

In addition, the mixture included a second component in the form of 6 parts by weight of yttria powder as supplied by Rare Earth Products Limited with a particle size of the order of 1 micron.

To produce the above mixture, the required amounts of the starting materials were colloid milled together using isopropyl alcohol as the carrier liquid and, after six passes through the mill, the resultant mixture was sieved using a sieve having a mesh size of 150 microns. After sieving, the mixture was cold isostatically pressed in a rubber bag at 20,000 p.s.i. so as to produce a preform having a green density of $1.6.\text{g.cm}^{-3}$. The resultant preform was then provided with a protective surface coating of silica together with 50% by weight of boron nitride, the coating having a thickness of between 0.01 and 0.02 inch. The coating materials were applied to the preform as a suspension in a mixture of iso-butyl-methyl-ketone with between 5 and 10% by volume of collodion, the suspension containing 40% by weight of solids.

The coated preform was then buried in a powered boron nitride protective medium contained in a graphite pot and was heated, without the application of pressure, to a sintering temperature of 1880° C. over a period of eighty minutes. The preform was then held at this temperature for a further sixty minutes to produce a product which, after cooling and removal from the graphite pot, was found to have a mean modulus of rupture value at 25° C. of 750 $MNm^{-2}$, a density of 3.152 and a Weibull modulus of 14. Moreover, it was found that a weight loss of only 0.4% had occurred during the sintering operation and that the final product consisted in excess of 90% by volume of a single phase compound obeying the formula:

$$Si_{6-z}Al_zN_{8-z}O_z$$

where z was equal to about 0.5.

The mean modulus of rupture value of the product of the first example was also measured at 1225° C. and was found to have decreased to 379 $MNm^{-2}$. A creep measurement on the material at 1227° C. with a load of 77 $MNm^{-2}$ showed the product to reach 0.05%, creep in 1 hour, thereby indicating the presence of a distributed glass phase. The product of the first example was also subjected to a further heat treatment process by re-burying the product in boron nitride powder contained in a graphite pot and heating, again without the application of pressure, to a temperature of 1400° C. over a period of 60 minutes. The sintered product was then held at this temperature for a further 5 hours and then allowed to cool. On removal from the graphite pot the heat treated product was found to have a mean modulus of rupture at 25° of 705 $MNm^{-2}$ and a Weibull modulus of 11, but exhibited an improved creep at 1227° C. in that time of 11 hours was taken for the product to undergo 0.05% creep at an applied load of 77 $MNm^{-2}$. X-ray diffraction analysis of the heat treated product showed the presence, in addition to the single phase ceramic of the above formula with z = 0.5, of yttrium aluminum garnet ($3Y_2O_3 \cdot 5Al_2O_3$) in an amount estimated to be of the order of 5% by volume. Also it was estimated from the creep figure that a major part of the glass in the original sample had been crystallized during the heat treatment so as to form the yttrium aluminum garnet, although a small percentage of glass still remained.

In a second example, the starting materials and processing procedure of the first example were repeated, but with the composition of the first component of the initial mixture being 92 parts by weight of silicon nitride, 6 parts by weight of aluminum nitride and 2 parts by weight of alumina so as to provide an atomic ratio of silicon and aluminum to nitrogen and oxygen of 0.75. As before the second component of the mixture was defined by 6 parts by weight of yttria. The sintered product had a mean modulus of rupture value at 25° C. of 564 $MNm^{-2}$, a density of 3.175 and a Weibull modulus of 16, with the weight loss during sintering being 0.44%. X-ray diffraction analysis of the product showed the presence of in excess of 90% by volume of the single phase ceramic of the above general formula with z = 0.5, together with yttrium silicon aluminum oxynitride ($Y_2 Si Al O_5 N$) in an amount estimated to be in the order of 6% by volume. A creep measurement on the material at 1227° C. with a load of 77 $MNm^{-2}$ showed the product to reach 0.05% creep in 32 hours, thereby indicating a reduction in the amount of glass compared with that in the first example.

The product of the second example was subjected to a re-heating process as in the previous example and using the same conditions. The product so formed was found to have a mean modulus of rupture at 25° C. of 709 $MNm^{-2}$ and a Weibull modulus of 8, while a creep test at 1227° C. with a load of 77 $MNm^{-2}$ showed the product to undergo 0.05% creep in 40 hours, thereby indicating a further reduction in the amount of glass present. X-ray diffraction analysis of the heat treated product showed, in addition to the single phase ceramic of the above general formula with z = − 0.5, the presence of yttrium aluminum garnet in an amount estimated to be in the order of 3% by volume, together with yttrium silicon aluminum oxynitride in an amount estimated to be 2% by volume.

In a third example, the starting materials and processing procedure of the first example were again repeated, but with the composition of the first component of the initial mixture being 92 parts by weight of silicon nitride, 7 parts by weight of aluminum nitride and 1 part by weight of alumina so as to provide a value of said atomic ratio of 0.753. The mixture again contained 6 parts by weight of yttria as the second component. The resultant product had a density of 3.141 and a mean modulus of rupture at 25° C. of 520 $MNm^{-2}$ with a Weibull modulus of 15, the mean modulus of rupture figure increasing to 608 $MNm^{-2}$ when the temperature was increased to 1225° C. A creep measurement taken on the material at 1227° C. with a load of 77 $MNm^{-2}$ showed the material to reach 0.05% creep in 8.5 hours, thereby indicating the presence of a small amount of a distributed glass phase. X-ray diffraction analysis showed the product again contained in excess of 90% by volume of a single phase compound obeying the above general formula with z being equal to about 0.5. The analysis showed the presence of yttrium silicon aluminum oxynitride in an amount estimated to be in the order of 5% by volume.

In order to effect crystallization of the glass phase and at the same time convert yttrium silicon aluminum oxynitride to yttrium aluminum garnet, thereby improving the high temperature properties, the product of the third example was subjected to a re-heating cycle as in the first example using the same conditions. The product so formed was found to have a Weibull modulus of 11 and a mean modulus of rupture at room temperature of 618 $MNm^{-2}$ and 620 $MNm^{-2}$ at 1225° C. Moreover, a creep test at 1227° C. with a load of 77 $MNm^{-2}$ showed the product to reach 0.05% creep in 70 hours indicating a reduced amount of glassy phase. X-ray diffraction analysis of the heat treated product showed the presence of the single phase ceramic of the above general formula with z equal to about 0.5 in an amount in excess of 90% by volume, together with yttrium aluminum garnet in an amount estimated to be in the order of 4% by volume. An estimated 2% by volume of a phase having a similar structure to $\alpha$-Wollastonite was also shown on the X-ray trace.

In a fourth example of the invention, the method of the third example was repeated but with a modified temperature processing schedule. Thus, the cold compacted preform was heated to a temperature of 1880° C. over a period of 1 hour 30 minutes and held at this temperature for 1 hour. The sintered product was then cooled to 1400° C. over a period of 17 minutes and held at this temperature for 5 hours before being allowed to cool naturally, while still protected, to room temperature. On removal from the boron nitride protective medium, the product was subjected to X-ray analysis which showed the product to contain more than 90% by volume of the single phase ceramic of the above formula with z = 0.5, together with yttrium aluminum garnet in an amount estimated to be 8% by volume. The mean modulus of rupture taken at 25° C. was found to be 535 $MNm^{-2}$ with a Weibull modulus of 9, while the modulus of rupture at 1225° C. was 622 $MNm^{-2}$ and at 1370° C. was 605 $MNm^{-2}$. A creep measurement taken at 1227° C. with a load of 77 $MNm^{-2}$ showed the material had not reached 0.05% creep even after a time of 120 hours, when the test was concluded, indicating that the product was largely absent of glass phase.

In the fourth example, it will be noted that the production of the second ceramic phase has been effected by controlling the cooling schedule from the sintering temperature of the mixture, rather than by producing a product which requires a further heat treatment cycle.

In a fifth example of the invention, the starting composition of the second example was subjected to the sintering and cooling program of the fourth example. The product was then subjected to X-ray diffraction analysis which showed the product to contain more than 90% by volume of the single phase ceramic of the above general formula with z = 0.5, together with yttrium aluminum garnet in an amount estimated to be 7% by volume. The mean modulus rupture taken at 25° C. was found to be 555 $MNm^{-2}$ with a Weibull modulus of 14. The modulus of rupture at 1225° C. was found to have increased to 574 $MNm^{-2}$.

In a sixth example of the invention, the starting composition of the first example was subjected to the sintering and cooling program of the fourth example. Once again the product was subjected to X-ray diffraction analysis which showed the product to contain more than 90% by volume of the single phase ceramic of the above general formula with z = 0.5, together with yttrium aluminum garnet in an amount estimated to be 5% by volume. The mean modulus of rupture taken at 25° C. was found to be 651 MNm$^{-2}$ with a Weibull Modulus of 13.

In each of the above examples, the ratio of the total number of aluminum and silicon atoms in the first component of the starting mixture to the total number of oxygen and nitrogen atoms has been 0.747 or above and it will be seen that heat treatment of the sintered ceramic product has resulted in sufficient reduction, by crystallization, of the glass phase to provide a significant increase in the high temperature properties of the product. It will also be noted that the improvement in high temperature properties obtained after heat treatment has increased as said atomic ratio has increased, a corresponding improvement in high temperature properties also being apparent without the heat treatment.

By way of contrast, in a seventh example, the method of the first example was repeated with a starting mixture in which the second component was again 6 parts by weight of yttria, while the relative weight proportions of silicon nitride, aluminum nitride, and alumina in the first component were 92:4:4 respectively so that the value of said atomic ratio was only 0.745. After sintering, the product was subjected to X-ray analysis which revealed more than 90% by volume of the single phase ceramic of the above general formula with z again being about 0.5, the remainder of the product being glass. The modulus of rupture of the product at room temperature was 733 MNm$^{-2}$ with a Weibull modulus of 14, while the modulus of rupture at 1225° C. was 274 MNm$^{-2}$. The creep at 1227° C. with a load of 77 MNm$^{-2}$ reached 0.05% in 0.7 hours. When the product was subjected to the heat treatment of the first example by heating to 1400° C. for 5 hours followed by natural cooling some yttrium aluminum garnet was formed, but the glass content remained high enough for the heat treatment to have little effect on the high temperature properties of the product.

To illustrate the effect of varying the z value of the silicon aluminum oxynitride in the ceramic product, in an eighth example a product containing a silicon aluminum oxynitride with a z value of 0.38 was produced from a starting mixture consisting of 94 parts by weight silicon nitride, 6 parts by weight aluminum nitride and 6 parts by weight of yttria. Thus the first component of the mixture defined by the silicon and aluminum nitride had a value for said atomic ratio of 0.75. Processing of the mixture was performed as in the first example and, after sintering at 1880° C., the resultant product was found to have a mean modulus of rupture value at 25° C. of 520 MNm$^{-2}$ with a Weibull modulus of 8. Moreover, the product was found to contain in excess of 80% by volume of the required silicon aluminum oxynitride.

In a ninth example, a ceramic product containing in excess of 80% by volume of a silicon aluminum oxynitride with a z value of 1.5 was produced from a starting mixture consisting of a first component defined by 70.6 parts by weight of silicon nitride, 16.35 parts by weight of aluminum nitride, 6 parts by weight of silica and 7.05 parts by weight of alumina and having a value of 0.75 for said atomic ratio, together with 7 parts by weight of yttria. Again the sintering procedure of the first example was followed and the resultant product was found to have a density of 3.15 and a modulus of rupture at 25° C. of 550 MNm$^{-2}$ with a Weibull modulus of 10, the weight loss during sintering being 1.5%.

In a tenth example of the invention a mixture consisting of 42 parts by weight of aluminum as supplied by The Aluminum Company of America with a particle size of about 20 microns, 14 parts by weight of silicon as supplied by Union Carbide Limited with an average particle size of 3 microns and 44 parts by weight of alumina supplied by Linde as Type B and having a nominal particle size of 0.05 microns was introduced into an alumina boat and then heated in a nitriding furnace. The nitriding atmosphere supplied to the furnace consisted of 64% by volume nitrogen, 6% by volume hydrogen and 30% by volume argon and, during nitriding, the temperature was carefully controlled to prevent thermal runaway by means of separate thermocouples in the reaction mixture and the furnace walls respectively. In particular, the temperatures registered by the thermocouples were compared and, if the temperature in the mixture exceeded that in the furnace walls, the supply of the nitriding atmosphere was terminated until the temperature in the mixture fell below that in the walls. A heating schedule which allowed the nitriding to proceed with a minimum amount of interruption was as follows:

(a) raising the temperature at a rate of 100° C./hour to 500° and holding for 24 hours,
(b) increasing the temperature at said rate from 500° C. to 600° C. and holding for seven hours,
(c) increasing the temperature at said rate from 600° C. to 1000° C. and holding for 24 hours,
(d) increasing the temperature at said rate from 1000° C. to 1100° C. and holding for 18 hours,
(e) increasing the temperature at said rate from 1100° C. to 1200° C. and holding for 5 hours,
(f) further increasing the temperature at said rate to 1300° C. and holding for 20 hours, and
(g) still further increasing the temperature at said rate to 1350° C. and holding for 6 hours.

After completion of the heating process, the nitrided mixture was allowed to cool in an argon atmosphere and was then removed from the furnace. The material was then jaw crushed and cone ground to a particle size below 500 microns and thereafter was cold isostatically pressed at 15000 psi into a pellet which was then introduced into a graphite pot and buried in boron nitride powder to provide a protective environment for the subsequent sintering operation. The temperature of the pot was then raised in 1½ hours from room temperature to 1500°–2000° C. preferably 1800° C., and then held at this temperature for 1 hour. Apart from some unconverted oxides, the resultant sintered product consisted substantially entirely of a single phase silicon aluminum oxynitride having a silicon aluminum oxynitride having a rhombohedral crystal structure and obeying the approximate formula $SiAl_4O_2N_4$. Thus this material constituted a different ceramic phase from the single phase compound based on the hexagonal β-phase silicon nitride lattice which constitutes the major constituent of the ceramic product of the invention. For the sake of convenience, this additional ceramic phase will hereafter be referred to as the phase 15R whereas the compound based on the hexagonal β-phase silicon nitride lattice will be identified by the reference character β'.

After removal from the graphite pot, the sintered mass of the 15R product was jaw crushed and then micronised to an average particle size of 7 microns. Twelve parts by weight of the ground 15R product was then mixed with 88 parts by weight of the silicon nitride powder of the first example to provide a first component in which the ratio of the number of silicon and aluminum atoms to the number of nitrogen and oxygen atoms was 0.747. In addition, 6 parts by weight of the yttria powder of the first example were added to the first component, whereafter the sintering procedure of the first example was repeated to produce a final product which had a mean modulus of rupture value at 25° C. of 767 MNm$^{-2}$., a density of 3.201 and a Weibull modulus of 13. The total weight loss during production of this product was found to be 4.18%. Moreover, during the final sintering operation, it was found that the 15R material and silicon nitride had been converted to the required $\beta'$ phase with z being 0.5, so that the latter constituted in excess of 90% by weight of the final sintered product, a small percentage of a second phase containing yttria also being indicated as being present.

In a modification, the method of the tenth example was repeated, but with the mixture subjected to the final sintering step containing varying proportions of yttria, the silicon nitride and 15R contents remaining as before. The results are summarised in the following Table:

| Sample | Yttria content % by weight | Z value of $\beta'$ | Density | Modulus of rupture (MNm$^{-2}$) at 25° C | Weibull modulus | weight loss |
|---|---|---|---|---|---|---|
| 1 | 5 | 0.5 | 3.087 | 636 | 9 | 1.9% |
| 2 | 7 | 0.5 | 3.197 | 815 | 13 | 0.48% |
| 3 | 8 | 0.5 | 3.196 | 730 | 13 | 1.5% |
| 4 | 9 | 0.5 | 3.255 | 795 | 10 | 2.6% |
| 5 | 10 | 0.5 | 3.180 | 581 | 7 | 0 |

From the above Table, it will be seen that the strength figure begins to fall as the yttria content approaches 10% by weight and the glass content becomes excessive.

In an eleventh example, 14.25 parts by weight of the 15R powder of the previous example were mixed with 85.75 parts by weight of the silicon nitride powder of the first example to provide a first component in which said atomic ratio was 0.75, and 7 parts by weight of the yttria powder of the first example were added to the first component. The sintering procedure of the first example was then repeated with the preform being held at the sintering temperature of 1840° C. for a period of 1 hour before natural cooling to a room temperature to produce a final product which had a mean modulus of rupture value at 25° C. of 810 MNm$^{-2}$ and a density of 3.208, the total weight loss during production of this product being 2%. During the final sintering operation it was found that the 15R material and silicon nitride has been converted to the required $\beta'$ phase material with z being 0.6 so that the latter constituted in excess of 90% by volume of the final sintered product. Transmission electron microscopy examination showed the product to contain a yttrium-containing glass phase in an amount of the order of 10% by volume.

In a modification to the eleventh example a further isostatically compacted preform of the silicon nitride, 15R material and yttria was subjected to the sintering procedure of the fourth example. X-ray examination revealed the resultant product to contain more than 90% by volume of expanded $\beta$-phase ceramic compound of the above general formula with z = 0.6 together with an estimated 1.5% by volume of yttrium aluminum garnet produced by partial conversion of the glass product during sintering. The mean modulus of rupture value at 25° C. was found to be 534 MNm$^{-2}$ with a density of 3.239.

In a twelfth example, the 15R and silicon nitride powders of the tenth example were again used, but in this case 15.75 parts by weight of the 15R powder was mixed with 84.25 parts by weight of the silicon nitride powder to provide a first component having a vlue of 0.752 for said atomic ratio. 7 parts by weight of the yttria powder used previously were added to the mixture and the processing of the tenth example was repeated. After cooling to room temperature and after removal from the protective environment, the product was subjected to X-ray analysis, and was found to contain in excess of 90% by volume of $\beta'$ of z = 0.7 together with a small percentage, estimated as being of the order of 1% by volume, of yttrium aluminum garnet. The density was found to be 3.221 while the modulus of rupture at room temperature was 630 MNm$^{-2}$.

In a thirteenth example of the invention, the method of the twelfth example was repeated, but with the first component consisting of 82.75 parts by weight of silicon nitride and 17.25 parts by weight of the ground 15R material so as to have a value of 0.754 for said atomic ratio, 7 parts by weight of the yttria again being present in the starting mixture. The product after sintering was found to contain by X-ray analysis more than 90% by volume of $\beta'$, with z = 0.8 together with yttrium silicon aluminum oxynitride, estimated to be in the order of 2% by volume, together with yttrium aluminum garnet, estimated to be in the order of 1.5% by volume. The modulus of rupture at room temperature was 570 MNm$^{-2}$ with a density of 3.200.

A further example of the preformed final mix of the thirteenth example was subjected to the sintering procedure of the fourth example, i.e. using a controlled cooling from the sintering stage. The resultant product, on cooling to room temperature and removal from its protective environment was found upon X-ray examination to be composed of more than 90% by volume of $\beta'$ of z = 0.8 together with yttrium aluminum garnet, estimated to be in the order of 5.5% by volume. The modulus of rupture at room temperature was 577 MNm$^{-2}$ with a density value of 3.230. A creep measurement on this product measured at 1227° C. with a load of 77 MNm$^{-2}$ was found to give 0.1% creep in 8 hours, indicating the presence of a glass phase.

In a fourteenth example of the invention, the method of the previous two examples were repeated, but with the preform mix containing 81.25 parts by weight of silicon nitride, 18.75 parts by weight of ground 15R and 7 parts by weight of yttria, the ratio of the number of aluminum and silicon atoms to the number of oxygen and nitrogen atoms in the first component defined by the silicon nitride and 15R being 0.756. The product from the sintering process of the first example showed on X-ray analysis the presence of more than 90% by volume of $\beta'$ with z = 0.9 together with an estimated 4% by volume of yttrium silicon aluminum oxynitride. The modulus of rupture at room temperature of this product was 520 MNm$^{-2}$ with a density value of 3.188. The product resulting from the modified sintering route of the fourth example showed on X-ray diffraction analysis more than 90% by volume $\beta'$ together with an estimated 7% by volume of yttrium aluminum garnet. The modulus of rupture of this product was 543 MNm$^{-2}$ at room temperature with a density of 3.179 whereas the creep measured at 1227° C. and loaded at 77 MNm$^{-2}$ was 0.1% creep in 48 hours, showing less glass phase than in the previous example.

In a fifteenth example, the modified method of the fourth example was repeated with a preform mix similar to that of the previous example but with the first component consisting of 79.75 parts by weight of silicon nitride and 20.25 parts by weight of ground 15R material so that said atomic ratio has a value of 0.758. X-ray diffraction analysis of the resulting product showed more than 90% by volume of $\beta'$ with $z = 1$, together with an estimated 8% by volume of yttrium aluminum garnet and a small percentage by volume of the order 1%, of yttrium silicon aluminum oxynitride. The modulus of rupture at room temperature was 500 MNm$^{-2}$ and the density was 3.224. The creep figure at 1227° C. and 77 MNm$^{-2}$ was 0.023% in 48 hours, showing the product to contain a negligible amount of glass.

In a sixteenth example, the procedure of the previous example was repeated but with the first component of the mixture consisting of 78.25 parts by weight of silicon nitride and 21.75 parts by weight of ground 15R so as to have a value of 0.76 for said atomic ratio, 7 parts by weight of yttria again also being present in the mixture. The product on X-ray analysis showed more than 90% by volume of $\beta'$ with a $z$ value of 1.1 together with an estimated 8.5% by volume yttrium aluminum garnet and a small percentage by volume (about 1%) of an yttrium silicate. The modulus of rupture at room temperature was 501 MNm$^{-2}$, with a density of 3.198, the commencement of the falling in strength and density figures indicating the product to be exclusively cermaic phases. The creep at 1227° C. and 77 MNm$^{-2}$ was 0.01% in 48 hours.

In the thirteenth to sixteenth example, where the modified sintering route has been employed, it will be noted that as the value of said atomic ratio for the 15R/silicon nitride component has increased, there has been a progressive increase in the yttrium aluminum garnet content resulting from progressive elimination of the glass phase, and a gradual improvement in the high temperature properties of the product.

Although yttria has been used as the second component of the sintering mixture in the above examples, it is to be appreciated that similar results are obtained with oxides of scandium, cerium, lanthanum and the elements of the lanthanide series.

While the sintering schedule of the above examples has been conducted in the absence of pressure, it will be appreciated that pressure could have been applied if required. It is, however, to be noted that the strength, density and creep figures obtained in the examples without the application of pressure are comparable with figures obtained with good hot pressed ceramics.

While in the examples, the protective environment for the sintering operation and the subsequent heat treatment has been provided by burying the samples in a powdered boron nitride surround in a graphite pot, it will be appreciated that the samples could have been sintered in a gaseous protective environment such as nitrogen.

We claim:

1. A method of producing a ceramic product, comprising the steps of forming a powder mixture consisting essentially of a first component consisting of compounds containing the elements silicon, aluminum, oxygen and nitrogen in proportions such that the total number of silicon and aluminum atoms to the total number of oxygen and nitrogen atoms lies in the range 0.735 to 0.77 and such that said compounds react together during the subsequent sintering process to produce a single phase ceramic material obeying the general formula:

$$Si_{6-z} Al_z O_z N_{8-z}$$

where $z$ is between 0.38 and 1.5, and between 0.1 and 10% by weight of a second component in the form of an oxide of at least one of the further elements, yttrium, scandium, cerium, lanthanum and the metals of the lanthanide series; and sintering said mixture in a protective environment with or without the application of presssure at a temperature between 1600° C. and 2000° C. and for a time, decreasing with increasing temperature, of at least 10 minutes to at least 5 hours so as to produce a ceramic material containing at least 80% by volume of said single phase ceramic material together with a second phase containing said at least one further element, which is a glass phase during sintering.

2. A method as claimed in claim 1, wherein the compounds of the first component consist of silicon nitride, aluminum nitride, alumina and silica, with at least part of the silica and alumina being present as inherent impurities on the silicon nitride and aluminum nitride respectively.

3. A method as claimed in claim 1, wherein the first component consists of silicon nitride and a ceramic intermediary containing a silicon aluminum oxynitride which has a rhombohedral structure and obeys the approximate formula $SiAl_4O_2N_4$.

4. A method as claimed in claim 3, wherein the ceramic intermediary is formed by heating a powder mixture of alumina, aluminum and silicon to between 1200° C. and 1400° C. in a nitriding atmosphere, the heating rate being controlled to substantially prevent exotherming, and then sintering the nitrided mixture at a temperature between 1500° C. and 1800° C.

5. A method as claimed in claim 3, wherein the ceramic intermediary is formed by heating a powder mixture of alumina, aluminum nitride and silicon nitride at a temperature between 1200° C. and 2000° C. in a protective environment.

6. A method as claimed in claim 1, wherein the relative proportions of the compounds of said first component are engaged so that the single phase ceramic material of the product has a $z$ value between 0.38 and 1.1 in said general formula.

7. A method as claimed in claim 1, wherein the relative proportions of the compounds of said first component are arranged so that said ratio lies between 0.745 and 0.76.

8. A method as claimed in claim 1, wherein said further element is yttrium.

9. A method as claimed in claim 1 wherein the second phase is a glass phase and the method includes the further step of heating the product to within 200° C. of the melting point of the glass and then cooling the product to crystallize at least part of the glass into a ceramic phase.

10. A method as claimed in claim 1 wherein the second phase is a glass phase at said sintering temperature and, when the sintering is complete, cooling of the product is controlled so as to crystallize the glass phase into a ceramic phase.

11. A method as claimed in claim 10 wherein the ceramic phase contains a metal aluminum garnet wherein the metal is said at least one further element.

12. A method as claimed in claim 9, wherein the ceramic phase contains a metal aluminum garnet wherein the metal is said at least one further element.

* * * * *

REEXAMINATION CERTIFICATE (268th)
United States Patent [19]
Lumby et al.

[11] B1 4,127,416
[45] Certificate Issued  Oct. 30, 1984

[54] METHOD OF PRODUCING A CERAMIC PRODUCT

[75] Inventors: Roland J. Lumby; Bernard North, both of Birmingham; Alfred J. Taylor, West Midlands, all of England

[73] Assignee: Lucas Industries Limited, Birmingham, England

Reexamination Request:
No. 90/000,440, Aug. 31, 1983

Reexamination Certificate for:
Patent No.: 4,127,416
Issued: Nov. 28, 1978
Appl. No.: 815,454
Filed: Jul. 13, 1977

[30] Foreign Application Priority Data

Jul. 24, 1976 [GB] United Kingdom ............... 30985/76
Jul. 24, 1976 [GB] United Kingdom ............... 30986/76
Feb. 21, 1977 [GB] United Kingdom ................ 7187/77

[51] Int. Cl.³ .................... C04B 35/50; C04B 35/58
[52] U.S. Cl. ........................... 501/98; 264/65; 264/66; 501/126; 501/152; 501/153; 501/154
[58] Field of Search ............... 501/98, 97, 152, 126, 501/153, 154; 264/65, 66

[56] References Cited

U.S. PATENT DOCUMENTS

| | | | |
|---|---|---|---|
| 3,830,652 | 8/1974 | Gazza | 501/98 |
| 3,991,148 | 11/1976 | Lumby et al. | 501/98 |
| 3,991,166 | 11/1976 | Jack et al. | 501/98 |
| 4,066,468 | 1/1978 | Kamigaito et al. | 501/98 |
| 4,071,371 | 1/1978 | Milberg et al. | 501/98 |
| 4,113,503 | 9/1978 | Lumby et al. | 501/98 |
| 4,143,107 | 3/1979 | Ishii et al. | 501/126 |

FOREIGN PATENT DOCUMENTS

50-128708 10/1975 Japan.

OTHER PUBLICATIONS

Crandall, W. B. et al., "Preparation and Evaluation of Si-Al-O-N", ITT Research Inst., Jun. 1973, Report No. ARL TR 74-0099 Distr. by NTIS, pp. 7-10, 32, 35, 56-57.

Kato, K. et al., "Structure Approach to the Problem of Oxygen Content in Alpha Silicon Nitride", J. Am. Cer. Soc., (1975), pp. 90-91, 264-265.

*Primary Examiner*—Helen McCarthy

[57] ABSTRACT

A method of producing a ceramic product which comprises the step of forming a powder mixture consisting essentially of a first component consisting of compounds containing the elements silicon, aluminum, oxygen and nitrogen in proportion such that the ratio of the total number of silicon and aluminum atoms to the total number of oxygen and nitrogen atoms lies in the range 0.735 to 0.77 and such that said compounds react together during the subsequent sintering process to produce a single phase ceramic material obeying the general formula:

$$Si_{6-z}Al_zO_zN_{8-z}$$

where z is between 0.38 and 1.5, and between 0.1 and 10% by weight of a second component in the form of an oxide of at least one of the further elements yttrium, scandium, cerium, lanthanum and the metals of the lanthanide series. The mixture is then sintered in a protective environment at a temperature between 1600° C. and 2000° C. and for a time, decreasing with increasing temperature, of at least 10 minutes to at least 5 hours so as to produce a ceramic material containing at least 80% by volume of said single phase ceramic material together with a second phase containing said at least one further element.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1, 2 and 9–12 are determined to be patentable as amended.

Claims 3, 4, 5, 7 and 8, dependent on an amended claim, are determined to be patentable.

1. A method of producing a ceramic product, [comprising] *consisting essentially of* the steps of forming a powder mixture consisting essentially of a first component consisting of compounds containing the elements silicon, aluminum, oxygen and nitrogen *and excluding added silica other than as an impurity* in proportions such that the total number of silicon and aluminum atoms to the total number of oxygen and nitrogen atoms lies in the range 0.735 to 0.77 and such that said compounds react together during the subsequent sintering process to produce a single phase ceramic material obeying the general formula:

$$Si_{6-z}Al_zO_zN_{8-z}$$

where z is between 0.38 and [1.5] *1.1*, and between 0.1 and 10% by weight of a second component in the form of an oxide of at least one of the further elements, yttrium, scandium, cerium, lanthanum and the metals of the lanthanide series; and sintering said mixture in a protective environment [with or] *without* the application of pressure at a temperature between 1600° C. and 2000° C. and for a time, decreasing with increasing temperature, of at least 10 minutes to at least 5 hours so as to produce a ceramic [material] *product* containing at least 80% by volume of said single phase ceramic material together with a second phase containing said at least one further element, which is a glass phase during sintering *and said second phase is selected from the group consisting of a glass phase or a crystalline phase having aluminum in the crystalline structure, or a combination thereof.*

2. A method as claimed in claim 1, wherein the compounds of the first component consist of silicon nitride, aluminum nitride, alumina and silica, *as an inherent impurity on the silicon nitride,* with at least part of the [silica and] alumina being present as *an* inherent [impurities] *impurity* on the [silicon nitride and] aluminum nitride [respectively].

9. A method as claimed in claim 1 wherein the second phase is a glass phase and the method includes the further step of heating the product to within 200° C. of the melting point of the glass and then cooling the product to crystallize at least part of the glass into a [ceramic] *crystalline* phase.

10. A method as claimed in claim 1 wherein the second phase is a glass phase at said sintering temperature and, when the sintering is complete, cooling of the product is controlled so as to crystallize the glass phase into a [ceramic] *crystalline* phase.

11. A method as claimed in claim 10 wherein the [ceramic] *crystalline* phase contains a metal aluminum garnet wherein the metal is said at least one further element.

12. A method as claimed in claim 9, wherein the [ceramic] *crystalline* phase contains a metal aluminum garnet wherein the metal is said at least one further element.

* * * * *